(12) United States Patent
Takagi et al.

(10) Patent No.: US 10,647,941 B2
(45) Date of Patent: *May 12, 2020

(54) DEFOAMING AGENT AND LUBRICATING OIL COMPOSITION

(71) Applicant: JXTG NIPPON OIL & ENERGY CORPORATION, Tokyo (JP)

(72) Inventors: Akira Takagi, Tokyo (JP); Shingo Matsuki, Tokyo (JP)

(73) Assignee: JXTG NIPPON OIL & ENERGY CORPORATION, Tokyo (JP)

(*) Notice: Subject to any disclaimer, the term of this patent is extended or adjusted under 35 U.S.C. 154(b) by 60 days.

This patent is subject to a terminal disclaimer.

(21) Appl. No.: 15/749,875

(22) PCT Filed: Aug. 19, 2016

(86) PCT No.: PCT/JP2016/074295
§ 371 (c)(1),
(2) Date: Feb. 2, 2018

(87) PCT Pub. No.: WO2017/030201
PCT Pub. Date: Feb. 23, 2017

(65) Prior Publication Data
US 2018/0208870 A1 Jul. 26, 2018

(30) Foreign Application Priority Data

Aug. 19, 2015 (JP) .................. 2015-162255
Aug. 12, 2016 (JP) .................. 2016-159016
Aug. 12, 2016 (JP) .................. 2016-159027

(51) Int. Cl.
*C10M 155/02* (2006.01)
*C10M 145/14* (2006.01)
(Continued)

(52) U.S. Cl.
CPC .......... *C10M 155/02* (2013.01); *B01D 19/04* (2013.01); *B01D 19/0409* (2013.01); *C08F 290/068* (2013.01); *C08F 299/08* (2013.01); *C10M 145/14* (2013.01); *C10M 159/005* (2013.01); *C10M 159/12* (2013.01); *C10M 169/04* (2013.01); *C10M 147/00* (2013.01); *C10M 2209/084* (2013.01); *C10M 2229/02* (2013.01); *C10M 2229/048* (2013.01); *C10M 2229/051* (2013.01); *C10N 2220/021* (2013.01); *C10N 2230/18* (2013.01); *C10N 2230/68* (2013.01);
(Continued)

(58) Field of Classification Search
CPC .............. C10M 145/14; C10M 147/00; C10M 155/02; C10M 159/005; C10M 159/12; C10M 169/04; C08F 283/124; C08F 290/068; C08F 299/08; B01D 19/04; B01D 19/049; C10N 2230/04; C10N 2230/18; C10N 2230/68
See application file for complete search history.

(56) References Cited

U.S. PATENT DOCUMENTS

| 4,082,690 A | 4/1978 | Farminer |
| 4,906,403 A * | 3/1990 | Berger .............. B01D 19/0409 |
| | | 516/123 |

(Continued)

FOREIGN PATENT DOCUMENTS

| CA | 2359946 | 7/2000 |
| CN | 101263182 | 9/2008 |

(Continued)

OTHER PUBLICATIONS

International Search Report of PCT/JP2016/074295, dated Nov. 1, 2016.

(Continued)

*Primary Examiner* — James C Goloboy

(74) *Attorney, Agent, or Firm* — Greenblum & Bernstein, P.L.C.

(57) ABSTRACT

A defoaming agent comprising: a polymer comprising a repeating unit represented by the following general formula (1):

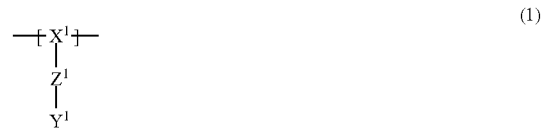

where in the general formula (1), $X^1$ is a repeating unit obtainable by polymerization of an ethylenic unsaturated group; $Y^1$ is a side chain comprising a linear or branched polysiloxane structure, the polysiloxane structure comprising a repeating unit represented by the following general formula (2) and having a polymerization degree of 5 to 300; and $Z^1$ is a linking group linking the repeating unit $X^1$ and the side chain $Y^1$;

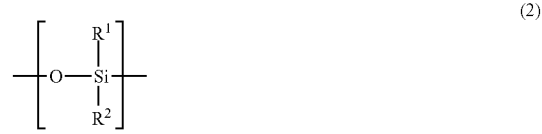

wherein in the general formula (2), $R^1$ and $R^2$ are each independently an organic group having a carbon number of 1 to 18.

17 Claims, 1 Drawing Sheet

(51) Int. Cl.
*C08F 299/08* (2006.01)
*C10M 159/12* (2006.01)
*B01D 19/04* (2006.01)
*C10M 159/00* (2006.01)
*C08F 290/06* (2006.01)
*C10M 169/04* (2006.01)
*C10M 147/00* (2006.01)

(52) U.S. Cl.
CPC ...... *C10N 2240/04* (2013.01); *C10N 2240/10* (2013.01)

(56) References Cited

U.S. PATENT DOCUMENTS

| | | |
|---|---|---|
| 5,766,513 A | 6/1998 | Pillon et al. |
| 2008/0207825 A1 | 8/2008 | Stark |
| 2009/0116808 A1* | 5/2009 | Kyota .................. C08F 218/04 385/141 |
| 2011/0163254 A1 | 7/2011 | Stark |
| 2011/0287206 A1* | 11/2011 | Suwa ..................... C08L 67/04 428/41.8 |
| 2013/0244917 A1* | 9/2013 | Obrecht ............... C10M 169/04 508/444 |
| 2014/0018267 A1 | 1/2014 | Loop et al. |
| 2014/0045053 A1* | 2/2014 | Ichikawa ................ B01F 17/00 429/188 |
| 2015/0218482 A1 | 6/2015 | Ito et al. |
| 2016/0281019 A1 | 9/2016 | Deklippel |
| 2018/0208871 A1 | 7/2018 | Takagi et al. |
| 2018/0223219 A1 | 8/2018 | Takagi et al. |
| 2019/0256790 A1 | 8/2019 | Takagi et al. |

FOREIGN PATENT DOCUMENTS

| | | |
|---|---|---|
| EP | 0632157 A1 | 1/1995 |
| EP | 1182236 | 2/2001 |
| EP | 2617745 A1 | 7/2013 |
| JP | 05228306 A * | 9/1993 |
| JP | 8-126801 | 5/1996 |
| JP | 11-209778 | 8/1999 |
| JP | 2000-087065 A | 3/2000 |
| JP | 2002-066206 | 3/2000 |
| JP | 2002-301306 | 10/2002 |
| JP | 2008-120889 A | 5/2008 |
| JP | 2008-542462 | 11/2008 |
| JP | 2009-235252 A | 10/2009 |
| JP | 2012-046762 | 3/2012 |
| JP | 2014-177608 | 9/2014 |
| JP | 2016-016367 | 2/2016 |
| WO | 2008/025718 A2 | 3/2008 |
| WO | 2008-046862 | 4/2008 |
| WO | 2008/055998 | 5/2008 |
| WO | 2017/030201 | 2/2017 |
| WO | 2017/030203 | 2/2017 |

OTHER PUBLICATIONS

International Preliminary Report on Patentability of PCT/JP2016/074295, dated Feb. 20, 2018.
ISR of PCT/JP2016/074297 dated Nov. 1, 2016.
IPRP of PCT/JP2016/074297 dated Feb. 20, 2018.
ISR of PCT/JP2016/074298 dated Nov. 22, 2016.
IPRP of PCT/JP2016/074298 dated Feb. 20, 2018.
U.S. OA issued in U.S. Appl. No. 15/749,919 dated Aug. 16, 2019.
ISR of PCT/JP2016/074296 dated Nov. 1, 2016.
IPRP of PCT/JP2016/074296 dated Feb. 20, 2018.
ISR of PCT/JP2018/006536 dated May 1, 2018.
IPRP of PCT/JP2018/006536 dated Aug. 27, 2019.
U.S. OA issued in U.S. Appl. No. 15/749,912 dated Sep. 25, 2019.
U.S. OA issued in U.S. Appl. No. 15/749,904 dated Oct. 11, 2019.
NOA issued in U.S. Appl. No. 15/749,919 dated Dec. 3, 2019.
NOA issued in U.S. Appl. No. 15/749,940 dated Mar. 25, 2020.

* cited by examiner

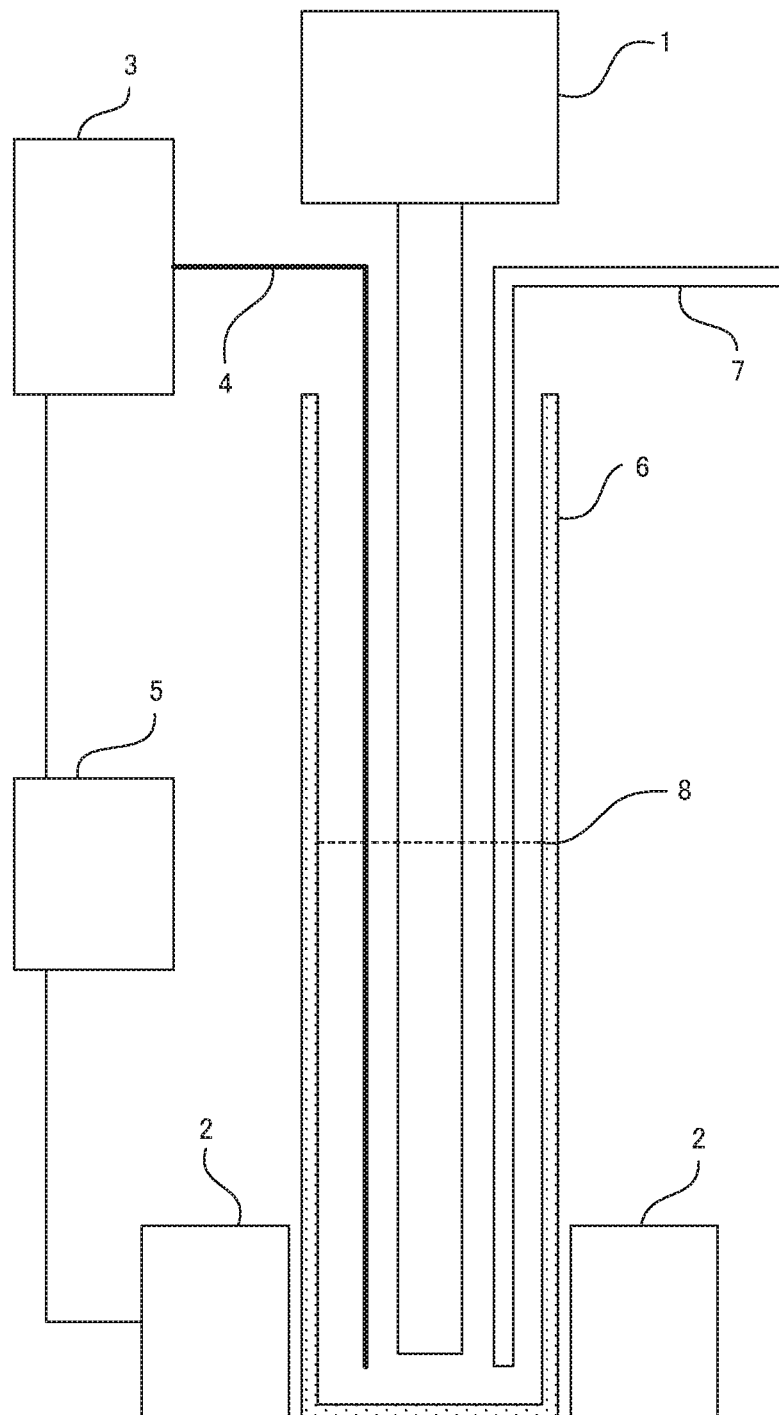

DEFOAMING AGENT AND LUBRICATING OIL COMPOSITION

FIELD

The present invention relates to defoaming agents, and lubricating oil compositions containing the defoaming agents.

BACKGROUND

Lubricating oil is used in various kinds of machinery so as to improve lubricity between members. Increase of foaming of the lubricating oil may lead to insufficient lubrication, failure to control hydraulic pressure, deteriorated cooling efficiency, and so on. Thus, lubricating oil is required to suppress foaming.

For example, automobile engines, transmissions, and axle units are demanding increasingly more from lubricating oil, accompanying their recent improvements in performance and fuel efficiency. Continuous high-load operation or high-speed driving increases foaming in engine oil, transmission oil, or axle unit oil, and as a result, leads to problems such as: failure to control hydraulic pressure due to incorporation of foam in hydraulic circuits; deteriorated lubricating performance or cooling efficiency due to foaming; wear and seizure due to breakage of oil films in friction portions; and promoted deterioration of lubricating oil due to oil temperature increase. Thus, there is demand for engine oil, transmission oil, and axle unit oil which can maintain high defoaming performance so as to suppress foaming for a long time from the initial stage of use.

Generally, lubricating oil contains base oil, and various additives incorporated according to desired characteristics. Examples of additives include defoaming agents to prevent foaming of lubricating oil. Polysiloxane defoaming agents (silicone defoaming agents) are conventionally known as defoaming agents. For example, Patent Literature 1 describes a lubricating oil composition formed by incorporating (a) polydimethylsiloxane having kinematic viscosity at 25° C. of 300,000 to 1,500,000 mm²/s, and (b) fluorinated polysiloxane having kinematic viscosity at 25° C. of 500 to 9,000 mm²/s. Patent Literature 2 discloses incorporating polydimethylsiloxane having a specific molecular weight distribution into lubricating oil to obtain defoaming effect on foam generated due to high-speed stirring.

CITATION LIST

Patent Literature

Patent Literature 1: JP 2000-87065 A
Patent Literature 2: JP 2009-235252 A
Patent Literature 3: JP 2008-120889 A

SUMMARY

Technical Problem

Disadvantageously, conventional lubricating oil containing a silicone defoaming agent compound suffers deteriorated defoaming performance in course of time of use when high-load operation or high-speed driving continues. For example, lubricating oil is subjected to high shear stress on a lubrication position inside an engine, an automatic transmission, an axle unit, etc. (such as a sliding part between a piston and a cylinder, a valve train, a high-speed rotation bearing, a belt-pulley, and a gear). Molecules of a silicone defoaming agent compound incorporated in the lubricating oil are cut due to high shear stress, which results in decrease of its molecular weight. While silicone defoaming agent compounds are desired to be insoluble in lubricating oil so as to exhibit defoaming effect, decreased molecular weights of silicone defoaming agent compounds lead to increased solubility in lubricating oil. As a result, defoaming performance of the lubricating oil deteriorates in the endurance stage, which may lead to failure to maintain sufficient defoaming performance for a long term.

An object of the present invention is to provide a defoaming agent which can maintain defoaming performance of lubricating oil for a long term even under such lubricating conditions that the lubricating oil is subjected to high shear stress. The present invention also provides a lubricating oil composition containing the defoaming agent.

Solution to Problem

The inventors have found that the above problems can be solved by using a comb-shaped or star-shaped polymer compound having a polysiloxane structure in its side chain.

A first aspect of the present invention is a defoaming agent comprising: a polymer comprising a repeating unit represented by the following general formula (1):

wherein in the general formula (1), $X^1$ is a repeating unit obtainable by polymerization of a first ethylenic unsaturated group; $Y^1$ is a side chain comprising a linear or branched polysiloxane structure, the polysiloxane structure comprising a repeating unit represented by the following general formula (2) and having a polymerization degree of 5 to 300; and $Z^1$ is a linking group linking the repeating unit $X^1$ and the side chain $Y^1$;

wherein in the general formula (2), $R^1$ and $R^2$ are each independently one or a combination of two or more selected from organic groups having 1 to 18 carbons.

In the first aspect of the present invention, the polymer may further comprise a repeating unit represented by the following general formula (3):

wherein in the general formula (3), $X^2$ is a repeating unit obtainable by polymerization of a second ethylenic unsaturated group, $Y^2$ is a side chain comprising no less than 3 fluorine atoms, and $Z^2$ is a linking group linking the repeating unit $X^2$ and the side chain $Y^2$.

In the first aspect of the present invention, preferably, $X^1$ is a repeating unit obtainable by polymerization of a first (meth)acryloyl group.

In the first aspect of the present invention, preferably, when the polymer comprises the repeating unit represented by the above described general formula (3), $X^2$ is a repeating unit obtainable by polymerization of a second (meth)acryloyl group.

In the first aspect of the present invention, preferably, the polymer comprises the repeating unit represented by the general formula (1) in an amount of no less than 10 mass % on the basis of the total mass of all repeating units in the polymer.

In the first aspect of the present invention, preferably, the polymer has a weight average molecular weight of 10,000 to 1,000,000.

In the first aspect of the present invention, the polymer may be a star-shaped polymer.

A second aspect of the present invention is a lubricating oil composition comprising: (A) a lubricant base oil; and (B) the defoaming agent according to the first aspect of the present invention, in an amount of 1 to 100 mass ppm in terms of silicon on the basis of the total mass of the composition.

The lubricating oil composition according to the second aspect of the present invention can be preferably used as a lubricating oil for an automobile engine, an automobile transmission, or an automobile transaxle unit.

Advantageous Effects of Invention

The defoaming agent and lubricating oil composition of the present invention make it possible to maintain defoaming performance of lubricating oil for a long term even under such lubricating conditions that the lubricating oil is subjected to high shear stress.

BRIEF DESCRIPTION OF DRAWINGS

FIG. 1 is an explanatory view of the structure of a homogenizer test machine that is used for the evaluation of defoaming performance.

DETAILED DESCRIPTION OF EMBODIMENTS

The present invention will be described hereinafter. Expression "A to B" concerning numeral ranges means "no less than A and no more than B" unless otherwise specified. In such expression, if a unit is added only to the numeral value B, the same unit is applied to the numeral value A.

<1. Defoaming Agent>

The defoaming agent according to the first aspect of the present invention comprises a polymer comprising a repeating unit represented by the following general formula (1):

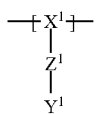
(1)

In the general formula (1), $X^1$ is a repeating unit obtainable by polymerization of an ethylenic unsaturated group, and constitutes a main chain; $Y^1$ is a side chain comprising a linear or branched polysiloxane structure having a polymerization degree of 5 to 300; and $Z^1$ is a linking group linking the repeating unit $X^1$ and the side chain $Y^1$.

In the polymer, $X^1$ may be a combination of two or more repeating units, $Y^1$ may be a combination of two or more side chains, and $Z^1$ may be a combination of two or more linking groups.

$Y^1$ is a side chain comprising a linear or branched polysiloxane structure that comprises a repeating unit represented by the following general formula (2) and has a polymerization degree of 5 to 300. The polymerization degree of the polysiloxane structure is preferably no less than 10, and more preferably no less than 30; and preferably no more than 250, and more preferably no more than 200. The polymerization degree of less than 5 leads to decreased shear stability or decreased defoaming performance of the defoaming agent. The polymerization degree of more than 300 leads to significant increase of viscosity of the defoaming agent, and thus leads to deteriorated defoaming performance thereof.

(2)

In the general formula (2), $R^1$ and $R^2$ are each independently one or a combination of two or more selected from organic groups having 1 to 18 carbons.

The polysiloxane structure of $Y^1$ may be linear or branched. Here, the linear polysiloxane structure means the structure represented by the following general formula (4):

(4)

In the general formula (4), $R^1$ and $R^2$ are as defined above, and n represents the polymerization degree.

The branched polysiloxane structure is obtainable by replacing $R^1$ and/or $R^2$ on the Si atom in one or more repeating units represented by the general formula (4) with a polysiloxane side chain comprising the repeating unit represented by the general formula (2). In the branched polysiloxane structure, the polysiloxane side chain may further comprise one or more branches. The polymerization degree of the polysiloxane structure equals to the total number of Si atoms thereof.

In the general formulae (2) and (4), examples of organic groups having 1 to 18 carbons include: substituted or unsubstituted alkyl groups, substituted or unsubstituted phenyl groups, fluoroalkyl groups, and polyether groups. Examples of substituents in substituted alkyl groups and substituted phenyl groups include: hydroxy group, amino groups, ether bond, and ester bond. The carbon numbers of $R^1$ and $R^2$ are 1 to 18, 1 to 12 in one embodiment, and 1 to 6 in another embodiment. Preferred examples of the organic groups include: methyl group, phenyl group, and fluoroalkyl groups. Among them, methyl group can be especially preferably employed.

A chain end of the polysiloxane structure of $Y^1$ which is not bonded with the linking group $Z^1$ may be bonded with, for example, the same group as $R^1$ or $R^2$ in the formulae (2) and (4), a $C_{1-12}$ hydrocarbyl group, a $C_{1-12}$ monovalent organic group having one or more functional groups (such as hydroxy group, amino groups, ether bond, ester bond, and amide bond), or a hydroxy group.

The linking group $Z^1$ is not limited as long as being able to link the repeating unit (main chain skeleton) $X^1$ and the side chain $Y^1$. Preferable examples of $Z^1$ include linking groups having an ester bond, an amide bond, an ether bond, a thioether bond, a thioester bond, a thionoester bond, a thioamide bond, or an imide bond. The linking group $Z^1$ may comprise one or more groups selected from linear or branched alkyl or alkylene groups, alicyclic groups, and aromatic groups, in addition to the above listed chemical bonds. The carbon number of the linking group $Z^1$ is not limited, but is not less than 0, preferably no more than 12, and more preferably no more than 6.

In one embodiment, the defoaming agent of the present invention can be obtained by polymerization or copolymerization of a (meth)acrylic acid derivative. In such an embodiment, $X^1$ is a repeating unit obtainable by polymerization of a (meth)acryloyl group. In the present description, "(meth)acryl" means acryl and/or methacryl, and "(meth)acryloyl" means acryloyl and/or methacryloyl. The repeating unit $X^1$ obtainable by polymerization of a (meth)acryloyl group is represented by the following general formula (5):

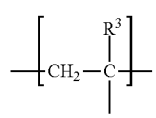

(5)

In the formula (5), $R^3$ represents a hydrogen atom or a methyl group; and a carbonyl group is bonded to one of the remaining atom valences of the carbon atom to which $R^3$ is bonded.

In such an embodiment, the repeating unit represented by the general formula (1) is preferably represented by the following general formula (6):

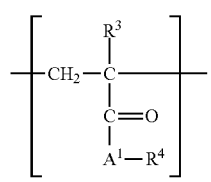

(6)

In the formula (6), $R^3$ is a hydrogen atom or a methyl group; $R^4$ is an organic group comprising a linear or branched polysiloxane structure, the polysiloxane structure comprising a repeating unit represented by the general formula (2) and having a polymerization degree of 5 to 300; and $A^1$ is an —O— group, a —NH— group, or a —S— group.

The polymer may be either a homopolymer or a copolymer. In view of improving defoaming performance, the proportion of the repeating units represented by the general formula (1) in the polymer is preferably no less than 10 mass %, more preferably no less than 50 mass %, further preferably no less than 65 mass %, especially preferably no less than 70 mass %, and may be 100 mass %, on the basis of the total mass of all repeating units (100 mass %) in the polymer.

In one embodiment, the polymer may further comprise a repeating unit represented by the following general formula (3):

(3)

In the formula (3), $X^2$ is a repeating unit obtainable by polymerization of an ethylenic unsaturated group; $Y^2$ is a side chain comprising no less than 3 fluorine atoms; and $Z^2$ is a linking group linking the repeating unit $X^2$ and the side chain $Y^2$.

In the formula (3), the groups same as those described above concerning $X^1$ can be employed as $X^2$. Preferred embodiments of $X^2$ are also same as those described above concerning $X^1$. The groups same as those described above concerning $Z^1$ can be employed as $Z^2$. Preferred embodiments of $Z^2$ are also same as those described above concerning $Z^1$. In the polymer, $X^2$ may be a combination of two or more repeating units, $Y^2$ may be a combination of two or more side chains, and $Z^2$ may be a combination of two or more linking groups.

$Y^2$ is a side chain comprising no less than 3 fluorine atoms. An organic group comprising no less than 3 fluorine atoms can be employed as $Y^2$ without any specific limitation. A fluoroalkyl group or a fluoroalkyl (poly)ether group can be preferably employed.

The number of fluorine atoms in the side chain $Y^2$ is no less than 3, preferably no less than 5, and more preferably no more than 17. The number of fluorine atoms in the side chain $Y^2$ of this lower limit or over leads to improved defoaming performance. The number of fluorine atoms in the side chain $Y^2$ over this upper limit makes it easy for the obtained polymer to solidify, and thus leads to deteriorated defoaming performance, which is thus unfavorable.

Examples of fluoroalkyl groups include: $C_{1-4}$ perfluoroalkyl groups; groups represented by the following general formula (7); groups represented by the following general formula (8); 1,1,1,3,3,3-hexafluoro-2-propyl group; 2,2-bis(trifluoromethyl)propyl group; perfluorocyclohexylmethyl group; pentafluorobenzyl group; 2,3,5,6-tetrafluorophenyl group; 2,2,2-trifluoro-1-phenyl-1-(trifluoromethyl)ethyl group; and 3-(trifluoromethyl)benzyl group.

(7)

In the formula (7), E is a fluorine atom or hydrogen atom; p is an integer of 1 to 6; q is an integer of 1 to 15; and when q is 1, E is a fluorine atom.

In the general formula (7), q is preferably no less than 2, and preferably no more than 8. q of this lower limit or over leads to improved defoaming performance. q over this upper limit makes it easy for the obtained polymer to solidify, and thus leads to deteriorated defoaming performance, which is thus unfavorable.

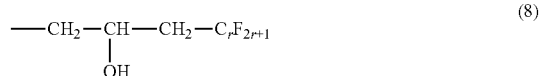

(8)

In the formula (8), r is an integer of 2 to 9.

In the general formula (8), r is preferably no less than 4, and preferably no more than 8. r of this lower limit or over leads to improved defoaming performance. r over this upper limit makes it easy for the obtained polymer to solidify, and thus leads to deteriorated defoaming performance, which is thus unfavorable.

Examples of the $C_{1-4}$ perfluoroalkyl group include: trifluoromethyl group, perfluoroethyl group, perfluoropropyl group, perfluoroisopropyl group, and perfluoro-tert-butyl group.

Examples of the group represented by the general formula (7) include: 2,2,2-trifluoroethyl group; 1H,1H,3H-hexafluorobutyl group; 2-(perfluorobutyl)ethyl group; 3-(perfluorobutyl)propyl group; 6-(perfluorobutyl)hexyl group; 2-(perfluoro-5-methylhexyl)ethyl group; 2-(perfluoro-7-methyloctyl)ethyl group; 4,4,5,5,5-pentafluoropentyl group; 2-(perfluorohexyl)ethyl group; 2-(perfluorooctyl)ethyl group; 3-(perfluorohexyl)propyl group; 3-(perfluorooctyl)propyl group; 1H,1H,3H-tetrafluoropropyl group; 1H,1H,5H-octafluoropentyl group; 1H,1H,7H-dodecafluoroheptyl group; 1H,1H,9H-hexadecafluorononyl group; 6-(perfluoro-1-methylethyl)hexyl group; 1H,1H-(3,5,5-tris(trifluoromethyl)octafluorohexyl group; 1H,1H,11H-eicosafluoroundecyl group; 2-(perfluoro-3-methylbutyl)ethyl group; 1H,1H-perfluoropropyl group; 1H,1H-perfluorobutyl group; 1H,1H-perfluoropentyl group; 1H,1H-perfluorohexyl group; 1H,1H-perfluoroheptyl group; 1H,1H-perfluorooctyl group; 1H,1H-perfluorononyl group; 1H,1H-perfluorodecyl group; 1H,1H-perfluoroundecyl group; 1H,1H-perfluorododecyl group; 1H,1H-perfluorotetradecyl group; 1H,1H-perfluorohexadecyl group; 1H,1H-perfluoro-3,7-dimethyloctyl group; 2-(perfluorodecyl)ethyl group; 2-(perfluorododecyl)ethyl group; and 2-(perfluoro-9-methyldecyl)ethyl group.

Examples of the group represented by the general formula (8) include: 3-(perfluorobutyl)-2-hydroxypropyl group; 3-(perfluoro-3-methylbutyl)-2-hydroxypropyl group; 3-(perfluorooctyl)-2-hydroxypropyl group; 3-(perfluoro-5-methylhexyl)-2-hydroxypropyl group; and 3-(perfluoro-7-methyloctyl)-2-hydroxypropyl group.

Examples of fluoroalkyl (poly)ether groups include: groups represented by the following general formula (9); 2-[(perfluoropropanoyl)oxy]ethyl group; and fluoropolyether groups comprising a perfluoropolyethylene oxide group, a perfluoropolypropylene oxide group, or a perfluoropolyoxetane group, and fluoropolyether copolymer groups thereof.

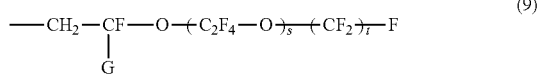

(9)

In the formula (9), G is a fluorine atom or a trifluoromethyl group; s is an integer of 0 to 2; and t is an integer of 1 to 4.

Examples of the group represented by the general formula (9) include: 1H,1H-perfluoro-3,6-dioxadecyl group; 1H,1H-perfluoro-3,6,9-trioxadecyl group; 1H,1H-perfluoro-3,6,9-trioxatridecyl group; 2-perfluoropropoxy-2,3,3,3-tetrafluoropropyl group; and 1H,1H-perfluoro-2,5-dimethyl-3,6-dioxanonyl group.

Among the above description, the group represented by the general formula (7) can be preferably employed as the side chain $Y^2$.

In one embodiment, $X^2$ is a repeating unit obtainable by polymerization of a (meth)acryloyl group. The repeating unit $X^2$ obtainable by polymerization of a (meth)acryloyl group is represented by the following general formula (10):

(10)

In the formula (10), $R^5$ is a hydrogen atom or a methyl group; and a carbonyl group is bonded to one of the remaining atom valences of the carbon atom to which $R^5$ is bonded.

In such an embodiment, the repeating unit represented by the general formula (3) is preferably represented by the following general formula (11):

(11)

In the formula (11), $R^5$ is a hydrogen atom or a methyl group; $Y^2$ is as described above; and $A^2$ is an —O— group, a —NH— group, or a "S" group.

In view of improving defoaming performance, the proportion of the repeating units represented by the general formula (3) in the polymer is preferably no more than 50 mass %, more preferably no more than 35 mass %, and further preferably no more than 30 mass %, on the basis of the total mass of all repeating units (100 mass %) in the polymer. The lower limit is not restricted, and may be 0 mass %. In one embodiment, the lower limit may be no less than 2 mass %. In another embodiment, the lower limit may be no less than 5 mass %.

In one embodiment, the polymer may be a star-shaped polymer. A star-shaped polymer may be obtained by, for example, copolymerization of a polymer mixture comprising a first monomer and a second monomer, the first monomer being at least one monomer giving the repeating unit of the general formula (1), the second monomer being at least one multifunctional monomer having two or more ethylene unsaturated groups. Examples of the multifunctional monomer include: (meth)acrylate esters of polyvalent alcohols, (meth)acrylate esters of alcohols having an ethylenic unsaturated group, (meth)acrylamides of polyvalent amines, diallyl compounds, triallyl compounds, and divinyl compounds. One multifunctional monomer may be used alone, or two or more multifunctional monomers may be used in combination.

Examples of polyvalent alcohols in the (meth)acrylate esters of polyvalent alcohols include: ethylene glycol, propylene glycol, butanediol, neopentyl glycol, bisphenol A, glycerin, trimethylolpropane, trimethylolethane, tris(2-hydroxyethyl)isocyanurate, pentaerythritol, ditrimethylolpropane, dipentaerythritol, and tripentaerythritol. The polyvalent alcohols may be modified with an alkylene oxide (such as ethylene oxide and propylene oxide), a lactone (such as caprolactone), or a hydroxy acid (such as hydroxypivalic acid).

Specific examples of (meth)acrylate esters of polyvalent alcohols include: ethylene glycol di(meth)acrylate, propylene glycol di(meth)acrylate, butanediol di(meth)acrylate, neopentyl glycol di(meth)acrylate, neopentyl glycol hydroxypivalate di(meth)acrylate, trimethylolpropane di(meth)acrylate, glycerol di(meth)acrylate, pentaerythritol di(meth)acrylate, dipentaerythritol di(meth)acrylate, tripentaerythritol di(meth)acrylate, bisphenol A-ethylene oxide adduct di(meth)acrylate, glycerol tri(meth)acrylate, trimethylolpropane tri(meth)acrylate, trimethylolethane tri(meth)acrylate, pentaerythritol tri(meth)acrylate, dipentaerythritol tri(meth)acrylate, tripentaerythritol tri(meth)acrylate, tris(2-hydroxyethyl)isocyanurate tri(meth)acrylate, ε-caprolactone-modified tri(2-hydroxyethyl)isocyanurate tri(meth)acrylate, ditrimethylolpropane tetra(meth)acrylate, pentaerythritol tetra(meth)acrylate, dipentaerythritol tetra(meth)acrylate, tripentaerythritol tetra(meth)acrylate, dipentaerythritol penta(meth)acrylate, tripentaerythritol penta(meth)acrylate, dipentaerythritol hexa(meth)acrylate, tripentaerythritol hexa(meth)acrylate, tripentaerythritol hepta(meth)acrylate, and tripentaerythritol octa(meth)acrylate.

Examples of (meth)acrylate esters of alcohols having an ethylenic unsaturated group include: allyl (meth)acrylate.

Examples of (meth)acrylamides of polyvalent amines include: N,N'-methylenebis((meth)acrylamide), and 1,3,5-triacryloylhexahydro-1,3,5-triazine.

Examples of diallyo or triallyl or divinyl compounds include: diallyl phthalate, diallyl maleate, diallyl fumarate, diallyl succinate, diallyl phenylphosphonate, triallyl isocyanurate, and divinylbenzene.

The star-shaped polymer may be a copolymer of at least one monomer giving the repeating unit the general formula (1) and at least one multifunctional monomer only, or may be a copolymer of at least one monomer giving the repeating unit of the general formula (1), at least one multifunctional monomer, and at least one comonomer other than them. In view of improving defoaming performance, the proportion of the repeating units represented by the general formula (1) in the star-shaped polymer is preferably no less than 10 mass %, more preferably no less than 50 mass %, and further preferably no less than 65 mass %; and preferably no more than 99.5 mass %, and more preferably no more than 99.2 mass %, on the basis of the total mass of all repeating units (100 mass %) in the star-shaped polymer.

The proportion of the repeating units originating from the multifunctional monomer in the star-shaped polymer is preferably no less than 0.1 mass %, and more preferably no less than 0.3 mass %; and preferably no more than 20 mass %, and more preferably no more than 10 mass %, on the basis of the total mass of all repeating units in (100 mass %) the star-shaped polymer. The proportion of the repeating units originating from the multifunctional monomer of this lower limit or over makes it easy to have the polymer star-shaped. The proportion of the repeating units originating from the multifunctional monomer of this upper limit or below makes it possible to prevent gelation of the star-shaped polymer.

Monomers other than the monomer giving the repeating unit of the general formula (1) or (3) and the above described multifunctional monomer include: a carboxylic acid ester having an ethylenic unsaturated group, the carboxylic acid having a $C_{1-30}$ linear or branched alkyl group as an alcohol residue (such as (meth)acrylate esters, fumaric acid diesters, phthalic acid monoesters, phthalic acid diesters, itaconic acid monoesters, and itaconic acid diesters), phthalic anhydride, itaconic anhydride, (meth)acrylonitrile, acrylamide, styrene, vinylpyridine, and vinyl esters of $C_{1-20}$ linear or branched chain aliphatic carboxylic acids.

In the defoaming agent of the present invention, the polymer preferably has a weight average molecular weight of 10,000 to 1,000,000, more preferably 30,000 to 450,000, and further preferably 32,000 to 450,000. Here, a weight average molecular weight means a weight average molecular weight in terms of polystyrene which is measured by gel permeation chromatography (GPC) using polystyrene as a standard substance. The weight average molecular weight of less than 10,000 leads to high solubility of the defoaming agent in base oil, and thus to deteriorated defoaming performance, which is thus not preferable. The weight average molecular weight of more than 1,000,000 leads to significant increase of viscosity of the defoaming agent, and thus to deteriorated defoaming performance, which is thus not preferable.

It is considered that the defoaming agent of the present invention can maintain high defoaming performance for a long term as a result of maintaining its molecular weight in lubricating oil for a long term even under such lubricating conditions that the lubricating oil is subjected to high shear stress.

A way of producing the defoaming agent of the present invention is not restricted, but any way can be suitable employed. For example, one may polymerize a raw material comprising a macromonomer having a structure in which an ethylenic unsaturated group is, via the linking group $Z^1$, bonded to a polysiloxane structure having a desired polymerization degree, or one may first build a main chain skeleton (comprising the repeating unit $X^1$) by polymerization reaction, and thereafter introduce the side chain $Y^1$ via the linking group $Z^1$ by reacting the resultant reaction product with a compound having a polysiloxane structure of a desired polymerization degree. In the polymerization reaction, known ways such as mass polymerization and solution polymerization can be used without any limitation. Among them, mass polymerization can be preferably employed.

<2. Lubricating Oil Composition>

The lubricating oil composition according to the second aspect of the present invention comprises: (A) a lubricant base oil; and (B) the defoaming agent according to the first aspect of the present invention (hereinafter may be referred to as "comb-shaped/star-shaped polymer defoaming agent") in an amount of 1 to 100 mass ppm in terms of silicon on the basis of the total mass of the composition.

((A) Lubricant Base Oil)

A lubricant base oil in the lubricating oil composition of the present invention is not restricted, but a mineral base oil or a synthetic base oil used for general lubricating oil can be used.

Specific examples of mineral base oils include: oils obtained by refining lubricant oil fractions that are obtained by vacuum distillation of atmospheric residue obtained by atmospheric distillation of crude oil, through at least one of processes such as solvent deasphalting, solvent extraction, hydrocracking, solvent dewaxing, and hydrorefining; wax isomerized mineral oils; and lubricant base oils produced by a process of isomerizing GTL WAX (gas to liquid wax) that is produced by a Fischer-Tropsch process, and the like.

Examples of synthetic base oils include: poly-α-olefins such as 1-octene oligomer and 1-decene oligomer, or hydrogenated products thereof; isobutene oligomer or hydrogenated product thereof; paraffin; alkylbenzene; alkylnaphthalene; diesters (such as ditridecyl glutarate, bis(2-ethylhexyl) azipate, diisodecyl azipate, ditridecyl azipate, and bis(2-ethylhexyl)sebacate); polyol esters (such as trimethylolpropane caprilate, trimethylolpropane pelargonate, pentaerythritol 2-ethylhexanoate, and pentaerythritol pelargonate); polyoxyalkylene glycol; dialkyl diphenyl ether; and polyphenyl ether. Examples other than them include: aromatic synthetic oils such as alkylnaphthalene, alkylbenzene, or mixtures thereof.

In the lubricating oil composition of the present invention, mineral base oils, synthetic base oils, any mixture of two or more lubricating oils selected therefrom, or the like can be used as the lubricant base oil. Examples thereof include at least one mineral base oil, at least one synthetic base oil, and a mixed oil of at least one mineral base oil and at least one synthetic base oil.

The kinematic viscosity of the base oil at 100° C. is preferably 1.0 to 50 mm$^2$/s. Too high kinematic viscosity of the base oil tends to lead to deteriorated low-temperature viscosity. In contrast, too low kinematic viscosity of the base oil leads to deteriorated anti-wear performance on sliding parts of various kinds of machinery. In view of preventing viscosity decrease of the obtained lubricating oil composition, the kinematic viscosity of the base oil at 100° C. is preferably 2.0 to 15 mm$^2$/s, and especially preferably 3 to 10 mm$^2$/s.

The pour point of the base oil is not restricted, but preferably is no more than −10° C., and especially no more than −15° C.

The viscosity index of the base oil is preferably no less than 105 in view of preventing viscosity decrease at high temperature.

((B) Comb-shaped/Star-shaped Polymer Defoaming Agent)

The defoaming agent (comb-shaped/star-shaped polymer defoaming agent) according to the first aspect of the present invention has already been described in detail. The content of the comb-shaped/star-shaped polymer defoaming agent in the lubricating oil composition of the present invention is 1 to 100 mass ppm in terms of silicon on the basis of the total mass of the composition. No effect is expectable as the defoaming agent if the content is less than 1 mass ppm in terms of Si. The content of more than 100 mass ppm in terms of Si leads to precipitation of the defoaming agent etc., and thus to deteriorated lifetime of the defoaming agent, which is thus unfavorable. The content of the comb-shaped/star-shaped polymer defoaming agent in the lubricating oil composition of the present invention is preferably no less than 5 mass ppm, and preferably no more than 50 mass ppm in terms of silicon on the basis of the total mass of the composition.

(Other Additives)

The lubricating oil composition according to the second aspect of the present invention may further contain at least one additive selected from (C) ashless dispersants, (D) antioxidants, (E) friction modifiers, (F) anti-wear agents or extreme-pressure agents, (G) metallic detergents, (H) viscosity index improvers or pour point depressants, (I) corrosion inhibitors, (J) anti-rust agents, (K) metal deactivators, (L) demulsifiers, (M) defoaming agents other than the polymer comprising the repeating unit of the general formula (1), and (N) coloring agents, in addition to the above described (A) lubricant base oil and (B) comb-shaped/star-shaped polymer defoaming agent. One may have an additive package by adding one or more additives selected from these (C) to (N) to the defoaming agent according to the first aspect of the present invention.

For example, known ashless dispersants such as succinimide ashless dispersants can be used as (C) ashless dispersants. Examples thereof include: polybutenylsuccinimides having a polybutenyl group, the polybutenyl group having a number average molecular weight of 900 to 3500; polybutenylbenzylamines; polybutenylamines; and derivatives thereof (such as boric acid-modified products).

When the lubricating oil composition of the present invention contains ashless dispersants, the content thereof is normally no less than 0.01 mass %, and preferably no less than 0.1 mass %; and normally no more than 20 mass %, and preferably no more than 10 mass %, on the basis of the total mass of the lubricating oil composition, that is, to the total mass of the lubricating oil composition as 100 mass %.

Known antioxidants such as phenol antioxidants and amine antioxidants can be used as (D) antioxidants. Examples thereof include amine antioxidants such as alkylated diphenylamines, phenyl-α-naphtylamine, alkylated α-napththylamines, and phenol antioxidants such as 2,6-di-tert-butyl-4-methylphenol, 4,4'-methlenebis(2,6-di-tert-butylphenol).

When the lubricating oil composition of the present invention contains antioxidants, the content thereof is normally no more than 5.0 mass %, and preferably no more than 3.0 mass %; and preferably no less than 0.1 mass %, and more preferably no less than 0.5 mass %, on the basis of the total mass of the lubricating oil composition.

Known friction modifiers can be used as (E) friction modifiers. Examples thereof include: aliphatic acid esters; aliphatic acid amides; phosphorus compounds such as phosphate esters, phosphite esters, and thiophosphate esters; organic molybdenum compounds such as MoDTP and MoDTC; organic zinc compounds such as ZnDTP; organic boron compounds such as alkylmercaptyl borates; graphite; molybdenum disulfide; antimony sulfide; boron compounds; and polytetrafluoroethylene.

When the lubricating oil composition of the present invention contains friction modifiers, the content thereof is normally 0.05 to 5 mass % on the basis of the total mass of the lubricating oil composition.

Known anti-wear agents or extreme-pressure agents can be used as (F) anti-wear agents or extreme-pressure agents. Examples thereof include metal dithiophosphates (such as Zn salt, Pb salt, Sb salt, and Mo salt), metal dithiocarbamates (such as Zn salt, Pb salt, Sb salt, and Mo salt), naphthenic acid metal salts (such as Pb salt), fatty acid metal salts (such as Pb salt), boron compounds, phosphate esters, phosphite esters, alkyl hydrogenphosphites, phosphate ester amine salts, phosphate ester metal salts (such as Zn salt), disulfides, sulfurized fat, sulfurized olefins, dialkyl polysulfides, diarylalkyl polysulfides, and diaryl polysulfides.

When the lubricating oil composition of the present invention contains anti-wear agents or extreme-pressure agents, the content thereof is normally 0.05 to 5 mass % on the basis of the total mass of the lubricating oil composition.

Known metallic detergents can be used as (G) metallic detergents. Examples thereof include alkali metal and alkaline earth metal sulfonates, alkali metal and alkaline earth metal phenates, alkali metal and alkaline earth metal salicylates, and combinations thereof. These metallic detergents may be overbased. Here, "alkaline earth metal" encompasses Mg.

When the lubricating oil composition of the present invention contains metallic detergents, the content thereof is not restricted. When the composition is for automobile transmissions, the content thereof is normally 0.005 to 1.0 mass % in terms of metal elements on the basis of the total mass of the lubricating oil composition. When the composition is for internal combustion engines, the content thereof is normally 0.01 to 5.0 mass % in terms of metal elements on the basis of the total mass of the lubricating oil composition. When the composition is for automobile transaxle units, the content thereof is normally 0.001 to 0.1 mass % in terms of metal elements on the basis of the total mass of the lubricating oil composition.

Known viscosity index improvers or pour point depressants can be used as (H) viscosity index improvers or pour point depressants. Examples of viscosity index improvers include so-called non-dispersant viscosity index improvers such as polymers and copolymers of one or at least two monomers selected from various methacrylates, and hydrogen adducts thereof; so-called dispersant viscosity index improvers that are copolymers of various methacrylates containing nitrogen compounds; non-dispersant or dispersant ethylene-α-olefin copolymers and hydrogen adducts thereof; polyisobutyrene and hydrogen adducts thereof; hydrogen adducts of styrene-diene copolymers; styrene-maleic anhydride copolymer; and polyalkylstyrenes. When the lubricating oil composition of the present invention contains viscosity index improvers, the content thereof is normally 0.1 to 20 mass % on the basis of total mass of the lubricating oil composition.

Examples of pour point depressants include polymethacrylate polymers. When the lubricating oil composition of the present invention contains pour point depressants, the content thereof is normally 0.01 to 1 mass % on the basis of the total mass of the lubricating oil composition.

For example, known corrosion inhibitors such as benzotriazole compounds, tolyltriazole compounds, thiadiazole compounds, and imidazole compounds can be used as (I) corrosion inhibitors. When the lubricating oil composition of the present invention contains corrosion inhibitors, the content thereof is normally 0.005 to 5 mass % on the basis of the total mass of the lubricating oil composition.

For example, known anti-rust agents such as petroleum sulfonates, alkylbenzenesulfonates, dinonylnaphthalenesulfonates, alkylsulfonate salts, fatty acids, alkenylsuccinic acid half esters, fatty acid soaps, polyol esters of fatty acids, fatty amines, oxidized paraffins, and alkyl polyoxyethylene ethers can be used as (J) anti-rust agents. When the lubricating oil composition of the present invention contains anti-rust agents, the content thereof is normally 0.005 to 5 mass % on the basis of the total mass of the lubricating oil composition.

For example, known metal deactivators such as imidazoline, pyrimidine derivatives, alkylthiadiazoles, mercaptobenzothiazole, benzotriazole and derivatives thereof, 1,3,4-thiadiazole polysulides, 1,3,4-thiadiazolyl-2,5-bisdialkyldithiocarbamates, 2-(alkyldithio)benzimidazoles, and β-(o-carboxybenzylthio)propionitrile can be used as (K) metal deactivators. When the lubricating oil composition of the present invention contains these metal deactivators, the content thereof is normally 0.005 to 1 mass % on the basis of the total mass of the lubricating oil composition.

For example, known demulsifiers such as polyalkylene glycol-based nonionic surfactants can be used as (L) demulsifiers. When the lubricating oil composition of the present invention contains demulsifiers, the content thereof is normally 0.005 to 5 mass % on the basis of the total mass of the lubricating oil composition.

For example, known defoaming agents such as silicones, fluorosilicones, and fluoroalkyl ethers can be used as (M) defoaming agents other than the polymer comprising the repeating unit of the general formula (1). When the lubricating oil composition of the present invention contains these defoaming agents, the content thereof is normally 0.0001 to 0.1 mass % on the basis of the total mass of the lubricating oil composition.

For example, known coloring agents such as azo compounds can be used as (N) coloring agents.

(Lubricating Oil Composition)

The viscosity of the lubricating oil composition of the present invention is not restricted. Generally, the comb-shaped/star-shaped polymer defoaming agent of the present invention can be preferably used in the lubricating oil composition whose kinematic viscosity at 100° C. is no less than 2 mm$^2$/s and no more than 20 mm$^2$/s, and is especially effective in the lubricating oil composition whose kinematic viscosity at 100° C. is no less than 2 mm$^2$/s and no more than 10 mm$^2$/s, which is of relatively low viscosity.

The lubricating oil composition of the present invention can maintain good defoaming performance for a long term. As a result, foaming of the lubricating oil can be suppressed for a long term, which makes it possible to suppress promoted deterioration of the lubricating oil, failure to control hydraulic pressure, wear and seizure, etc. due to foaming, for a long term.

(Use)

The lubricating oil composition of the present invention can be widely used for the purpose of lubrication that demands defoaming performance especially in view of the above described functions and effect. For example, the lubricating oil composition of the present invention can be preferably used as internal combustion engine oil, hydraulic oil, industrial gear oil, turbine oil, compressor oil, transmission oil, and automobile axle unit oil, and among them, especially preferably used as automobile engine oil, automobile transmission oil, or automobile axle unit oil.

(Production)

A method for producing the lubricating oil composition of the present invention is not restricted. It can be produced by known methods, for example, preparing a dilution by dissolving the defoaming agent in a hydrocarbon solvent which can dissolve a base oil and the defoaming agent, or by finely dispersing the defoaming agent in a small amount of a base oil by vigorous stirring, and thereafter adding the dilution to a lubricating oil comprising a base oil, or comprising a base oil and at least one additive other than the defoaming agent.

The concentration of the defoaming agent in the dilution is preferably no less than 500 mass ppm, more preferably no less than 1,000 mass ppm, and further preferably no less than 3,000 mass ppm; and preferably no more than 50,000 mass ppm, and more preferably no more than 40,000 mass ppm in terms of silicon on the basis of the total mass of the dilution. The concentration of the defoaming agent in the dilution of this lower limit or over makes it possible to suppress a flash point of the lubricating oil from decreasing due to the dilution. The concentration of the defoaming agent in the dilution of this upper limit or below makes it easy to suppress deterioration of lifetime of the defoaming agent due to precipitation of the defoaming agent.

The amount of the dilution to be added to the lubricating oil can be such an amount that the above described preferred concentration of the defoaming agent in the lubricating oil composition of the present invention is realized.

The lubricating oil before addition of the dilution may already contain additives other than the defoaming agent, in addition to a base oil. One may also add the dilution to a lubricating oil consisting of a base oil and not comprising additives other than the defoaming agent, and thereafter add other additives.

When adding the dilution in which the defoaming agent is dissolved or finely dispersed to the lubricating oil, one may add the dilution to the lubricating oil little by little successively (for example, dropwise) while mixing, or one may add a desired amount of the dilution to the lubricating oil in one portion. In view of more finely dispersing the defoaming agent in the lubricating oil composition, it is preferable to successively add the dilution to the lubricating oil while mixing.

EXAMPLES

Hereinafter the present invention will be more specifically described based on the examples and comparatives examples. The following examples are intended to show examples of the present invention, but not intended to limit the present invention.

PREPARATION EXAMPLES (Measurement of Molecular Weight and Molecular Weight Distribution)

In the following preparation examples and examples, molecular weights and molecular weight distributions were measured using a GPC system (HLC-8220 manufactured by Tosoh Corporation) equipped with three columns (TSKgel SuperMultiporeHZ-M; 4.6 mm in internal diameter×15 cm, manufactured by Tosoh Corporation) connected in series and a differential refractometer (RI) detector, using tetrahydrofuran as a mobile phase, and polystyrene as a standard material, under conditions of measurement temperature: 40° C., flow rate: 0.35 mL/min, sample concentration: 1 mass %, and sample injection volume: 5 μL.

Preparation Example 1

A comb-shaped polymer defoaming agent A according to the first aspect of the present invention was prepared by the following procedures:

To a 100 ml four-necked flask equipped with a stirrer wing made from polytetrafluoroethylene (with vacuum sealing), a Dimroth condenser, a three-way valve for nitrogen introduction, and a sample inlet, 30 parts by mass of KF2012 (methacrylate-modified polydimethylsiloxane; manufactured by Shin-Etsu Chemical Co., Ltd.; functional group equivalent 4,600 g/mol), and 0.060 parts by mass of dodecyl mercaptan were introduced and stirred to be a uniform mixture, and thereafter the reaction system was vacuum-degassed and purged with nitrogen five times using a dia-phragm pump. Under a nitrogen flow, 0.45 parts by mass of MAIB (dimethyl 2,2'-azobisisobutyrate; azo type initiator manufactured by Otsuka Chemical Co., Ltd.) as a radical polymerization initiator was introduced from the sample inlet, and the resultant mixture was stirred for 8 hours at polymerization temperature of 70° C. under a nitrogen atmosphere to conduct a polymerization reaction, to afford the comb-shaped polymer defoaming agent A. As a result of GPC analysis (standard material: polystyrene), the weight average molecular weight (Mw) of the obtained comb-shaped polymer defoaming agent A was 32,000, and the polydispersity index thereof (Mw/Mn) was 1.40.

Preparation Examples 2 to 9

Comb-shaped polymer defoaming agents B to I according to the first aspect of the present invention were prepared in the same way as the preparation example 1 except that the amount of KF2012, dodecyl mercaptan, and TDF-OMA (1H,1H,2H,2H-perfluorooctyl methacrylate) were changed as in the following Table 1:

TABLE 1

| Preparation example | 1 | 2 | 3 | 4 | 5 | 6 | 7 | 8 | 9 |
|---|---|---|---|---|---|---|---|---|---|
| Defoaming agent | A | B | C | D | E | F | G | H | I |
| Amounts of raw materials added (parts by mass) | | | | | | | | | |
| KF2012 (*1) | 30 | 30 | 30 | 30 | 30 | 30 | 27 | 24 | 21 |
| TDF-OMA (*2) | — | — | — | — | — | — | 3 | 6 | 9 |
| dodecyl mercaptan | 0.060 | 0.048 | 0.036 | 0.024 | 0.006 | 0.002 | 0.024 | 0.04 | 0.024 |
| MAIB (*3) | 0.45 | 0.45 | 0.45 | 0.45 | 0.45 | 0.45 | 0.45 | 0.45 | 0.45 |
| Properties of defoaming agent | | | | | | | | | |
| Mw | 32000 | 49000 | 79000 | 125000 | 218000 | 422000 | 132000 | 128000 | 125000 |
| Mw/Mn | 1.40 | 1.42 | 1.44 | 1.72 | 2.11 | 2.88 | 1.75 | 1.69 | 1.68 |

(*1) methacrylate-modified polydimethyl siloxane, functional group equivalent 4,600 g/mol
(*2) 1H,1H,2H,2H-tridecafluoro-n-octyl methacrylate
(*3) dimethyl 2,2'-azobisisobutyrate Preparation Example 10

A star-shaped polymer defoaming agent J according to the first aspect of the present invention was prepared by the following procedures:

To a 100 ml four-necked flask equipped with a stirrer wing made from polytetrafluoroethylene (with vacuum sealing), a Dimroth condenser, a three-way valve for nitrogen introduction, and a sample inlet, 30 parts by mass of KF2012 (methacrylate-modified polymethylsiloxane; manufactured by Shin-Etsu Chemical Co., Ltd.; functional group equivalent 4,600 g/mol), and 1.50 parts by mass of EGDMA (ethylene glycol dimethacrylate) were introduced and stirred to be a uniform mixture, and thereafter the reaction system was vacuum-degassed and purged with nitrogen five times using a diaphragm pump. Under a nitrogen flow, 0.30 parts by mass of PEROCTA O (1,1,3,3-tetramethylbutyl peroxy-2-ethylhexanoate; a peroxide radical polymerization initiator; manufactured by NOF CORPORATION) as a radical polymerization initiator was introduced from the sample inlet, and the resultant mixture was stirred for 8 hours at polymerization temperature of 70° C. under a nitrogen atmosphere to conduct a polymerization reaction, to afford the star-shaped polymer defoaming agent J. As a result of GPC analysis (standard material: polystyrene), the weight average molecular weight (Mw) of the obtained star-shaped polymer defoaming agent J was 763,000, and the polydispersity index thereof (Mw/Mn) was 3.39.

Preparation Examples 11 to 16

Star-shaped polymer defoaming agents K to P according to the first aspect of the present invention were prepared in the same way as the preparation example 10 except that the amounts of KF2012, EGDMA, TDF-OMA, PEROCTA O, and MAIB were changed as in the following Table 2:

TABLE 2

| Preparation example | 10 | 11 | 12 | 13 | 14 | 15 | 16 |
|---|---|---|---|---|---|---|---|
| Defoaming agent | J | K | L | M | N | O | P |
| Amounts of raw materials added (parts by mass) | | | | | | | |
| KF2012 (*1) | 30 | 30 | 30 | 30 | 27 | 24 | 21 |
| TDF-OMA (*2) | — | — | — | — | 3 | 6 | 9 |
| EDGMA (*3) | 1.50 | 0.75 | 0.30 | 0.30 | 0.30 | 0.30 | 0.30 |
| POO (*4) | 0.30 | 0.30 | 0.30 | — | — | — | — |
| MAIB (*5) | — | — | — | 0.30 | 0.30 | 0.30 | 0.30 |
| Properties of defoaming agent | | | | | | | |
| Mw | 763000 | 250000 | 132000 | 133000 | 135000 | 130000 | 129000 |
| Mw/Mn | 3.39 | 1.79 | 1.56 | 1.58 | 1.77 | 1.71 | 1.68 |

(*1) KF2012: single-end methacryl-modified silicone, functional group equivalent 4,600 g/mol, by Shin-Etsu Chemical Co., Ltd
(*2) TDF-OMA: 1H,1H,2H,2H-tridecafluoro-n-octyl methacrylate by Tokyo Chemical Industry Co., Ltd.
(*3) EDGMA: ethylene glycol dimethacrylate
(*4) POO: 1,1,3,3-tetramethylbutyl peroxy-2-ethylhexanoate, peroxide radical initiator, PEROCTA O by NOF CORPORATION
(*4) MAIB: dimethyl 2,2'azobisisobutyrate, azo type radical initiator by Otsuka Chemical Co., Ltd.

Examples 1 to 20 and Comparative Examples 1 to 4

As shown in Tables 3 to 5, lubricating oil compositions according to the second aspect of the present invention (Examples 1 to 20), and lubricating oil compositions for comparison (Comparative Examples 1 to 4) were prepared. In Tables 3 to 5, "Si ppm" means mass ppm in terms of silicon. Defoaming agents were incorporated into lubricating oil compositions by the following procedure: a defoaming agent was added to kerosene and was sufficiently stirred to prepare a dilution (defoaming agent concentration: 0.3 mass % in terms of silicon on the basis of the total mass of the dilution) comprising the defoaming agent dissolved in kerosene. Thereafter, the dilution was added to a lubricating oil composition dropwise while stirring, to afford a lubricating oil composition having a defoaming agent concentration as in Tables 3-5.

TABLE 3

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Lubricating oil | Transmission oil (*1) | | balance | balance | balance | balance | balance | balance | balance | balance | balance | | |
| | Engine oil (*2) | | | | | | | | | | | balance | balance |
| Defoaming agent | Defoaming agent A (*3) | Si ppm | 10 | | | | | | | | | | |
| | Defoaming agent B (*4) | Si ppm | | 10 | | | | | | | | | |
| | Defoaming agent C (*5) | Si ppm | | | 10 | | | | | | | 30 | 10 |
| | Defoaming agent D (*6) | Si ppm | | | | 10 | | | | | | | |
| | Defoaming agent E (*7) | Si ppm | | | | | 10 | | | | | | |
| | Defoaming agent F (*8) | Si ppm | | | | | | 10 | | | | | |
| | Defoaming agent G (*9) | Si ppm | | | | | | | 10 | | | | |
| | Defoaming agent H (*10) | Si ppm | | | | | | | | 10 | | | |
| | Defoaming agent I (*11) | Si ppm | | | | | | | | | 10 | | |
| Amount of Foaming in Homogenizer Test | | | | | | | | | | | | | |
| Fresh Oil | | mL | 70 | 60 | 50 | 50 | 50 | 60 | 50 | 50 | 50 | 50 | 50 |
| After 4 hours of shearing (*12) | | mL | 80 | 70 | 60 | 80 | 60 | 70 | 60 | 60 | 60 | 60 | 60 |

(*1) transmission oil obtained by removing defoaming agents from "ENEOS FINE AT FLUID" by JX Nippon Oil & Energy Corportaion, kinematic viscosity at 100° C.: 7.3 mm²/s.
(*2) engine oil obtained by removing defoaming agents from "ENEOS FINE 5W20" by JX Nippon Oil & Energy Corportaion, kinematic viscosity at 100° C.: 8.2 mm²/s.
(*3) comb-shaped polymer defoaming agent A of preparation example 1, Mw 32,000
(*4) comb-shaped polymer defoaming agent B of preparation example 2, Mw 49,000
(*5) comb-shaped polymer defoaming agent C of preparation example 3, Mw 79,000
(*6) comb-shaped polymer defoaming agent D of preparation example 4, Mw 125,000
(*7) comb-shaped polymer defoaming agent E of preparation example 5, Mw 218,000
(*8) comb-shaped polymer defoaming agent F of preparation example 6, Mw 422,000
(*9) comb-shaped polymer defoaming agent G of preparation example 7, Mw 132,000
(*10) comb-shaped polymer defoaming agent H of preparation example 8, Mw 128,000
(*11) comb-shaped polymer defoaming agent I of preparation example 9, Mw 125,000
(*12) shearing conditions: sharing by ultrasonication conforming to JASO M347, shearing time: 4 hours

TABLE 4

| | | | Example | | | | | | | | |
|---|---|---|---|---|---|---|---|---|---|---|---|
| | | | 12 | 13 | 14 | 15 | 16 | 17 | 18 | 19 | 20 |
| Lubricating oil | Transmission oil (*1) | | balance | balance | balance | balance | balance | balance | balance | | |
| | Engine oil (*2) | | | | | | | | | balance | balance |
| Defoaming agent | Defoaming agent J (*3) | Si ppm | 10 | | | | | | | | |
| | Defoaming agent K (*4) | Si ppm | | 10 | | | | | | | |
| | Defoaming agent L (*5) | Si ppm | | | 10 | | | | | 30 | 10 |
| | Defoaming agent M (*6) | Si ppm | | | | 10 | | | | | |
| | Defoaming agent N (*7) | Si ppm | | | | | 10 | | | | |
| | Defoaming agent O (*8) | Si ppm | | | | | | 10 | | | |
| | Defoaming agent P (*9) | Si ppm | | | | | | | 10 | | |
| Amount of Foaming in Homogenizer Test | | | | | | | | | | | |
| Fresh Oil | | mL | 60 | 60 | 50 | 50 | 50 | 50 | 50 | 50 | 50 |
| After 4 hours of shearing (*10) | | mL | 80 | 70 | 60 | 60 | 60 | 60 | 60 | 60 | 60 |

(*1) transmission oil obtained by removing defoaming agents from "ENEOS FINE AT FLUID" by JX Nippon Oil & Energy Corportaion, kinematic viscosity at 100° C.: 7.3 mm²/s.
(*2) engine oil obtained by removing defoaming agents from "ENEOS FINE 5W20" by JX Nippon Oil & Energy Corportaion, kinematic viscosity at 100° C.: 8.2 mm²/s.
(*3) star-shaped polymer defoaming agent J of preparation example 10, Mw 763,000
(*4) star-shaped polymer defoaming agent K of preparation example 11, Mw 250,000
(*5) star-shaped polymer defoaming agent L of preparation example 12, Mw 132,000
(*6) star-shaped polymer defoaming agent M of preparation example 13, Mw 133,000
(*7) star-shaped polymer defoaming agent N of preparation example 14, Mw 135,000
(*8) star-shaped polymer defoaming agent O of preparation example 15, Mw 130,000
(*9) star-shaped polymer defoaming agent P of preparation example 16, Mw 129,000
(*10) shearing conditions: ultrasonic wave shear conforming to JASO M347, shearing time: 4 hours

TABLE 5

| | | | Comparative Example | | | |
|---|---|---|---|---|---|---|
| | | | 1 | 2 | 3 | 4 |
| Lubricating oil | Transmission oil (*1) | | balance | balance | | |
| | Engine oil (*2) | | | | balance | balance |
| Defoaming agent | Defoaming agent Q (*3) | Si ppm | 10 | | | |
| | Defoaming agent R (*4) | Si ppm | | 10 | 30 | 10 |
| Amount of Foaming in Homogenizer Test | | | | | | |
| Fresh Oil | | mL | 60 | 50 | 50 | 50 |
| After 4 hours of shearing (*5) | | mL | 100 | 100 | 100 | 100 |

(*1) transmission oil obtained by removing defoaming agents from "ENEOS FINE AT FLUID" by JX Nippon Oil & Energy Corportaion, kinematic viscosity at 100° C.: 7.3 mm²/s.
(*2) engine oil obtained by removing defoaming agents from "ENEOS FINE 5W20" by JX Nippon Oil & Energy Corportaion, kinematic viscosity at 100° C.: 8.2 mm²/s.
(*3) KF-96 by Shin-Etsu Chemical Co., Ltd., viscosity: 5000 cSt, dimethyl silicone defoaming agent
(*4) KF-96 by Shin-Etsu Chemical Co., Ltd., viscosity: 50000 cSt, dimethyl silicone defoaming agent
(*5) shearing conditions: sharing by ultrasonication conforming to JASO M347, shearing time: 4 hours

Evaluation 1: Defoaming Performance

Defoaming performance of each of the prepared lubricating oil compositions was evaluated by a homogenizer test machine shown in FIG. 1. The homogenizer test machine shown in FIG. 1 includes a homogenizer 1, a cylindrical heater for heating 2, a temperature adjuster 3, a thermocouple for oil temperature measurement 4, an electric power source for the heater 5, a glass cylinder corresponding to an oil tank 6 (graduated cylindrical glass vessel, 40 mm in inner diameter, 300 mm in depth, 2 mL grading divisions from 0 to 250 mL), and an air blow tube (air blow rate: 30 mL/min) 7.

To the glass cylinder 6, 150 mL of a sample oil was introduced. The temperature of the sample oil was raised to 120° C. by the cylindrical heater for heating 2. An oil surface level at this time was recorded as a reference oil surface level 8. Then the oil was stirred with the homogenizer 1, and the difference between an oil surface level after 10 minutes stirring and the reference oil surface level was recorded as the amount of foaming. The results are shown in Tables 3 to 5.

Evaluation 2: Shear Durability

Each of the above described prepared lubricating oil compositions was subjected to shearing by ultrasonication for 4 hours conforming to JASO M347 (test method for shear stability of automatic transmission fluids), to obtain 180 mL of a sample oil. Defoaming performance of the sample oil after shearing was evaluated in the same way as the above evaluation 1. The results are shown in Tables 3 to 5.

As can be seen from Tables 3 to 5, all the lubricating oil compositions comprising the defoaming agents of the present invention (examples 1 to 20) were good in not only defoaming performance of the fresh oils, but also defoaming performance of the sample oils after application of shear stress. In contrast, in comparative examples 1 to 4, which used the defoaming agents outside the scope of the present invention, the sample oils after application of shear stress showed significantly deteriorated defoaming performance compared to that of the fresh oils.

The above test results show that the defoaming agent and the lubricating oil composition of the present invention can maintain defoaming performance of lubricating oil for a long term even under such lubricating conditions that the lubricating oil is subjected to high shear stress.

INDUSTRIAL APPLICABILITY

The defoaming agent and the lubricating oil composition of the present invention can be preferably employed for any lubricating oil composition that demands defoaming performance under such lubricating conditions that lubricating oil is subjected to high shear stress, and among them, can be especially preferably employed for automobile engine oil, transmission oil, or transaxle oil.

REFERENCE SIGNS LISTS 1 homogenizer
2 cylindrical heater for heating
3 temperature adjuster
4 thermocouple for oil temperature measurement
5 electric power source for the heater
6 glass cylinder corresponding to an oil tank (graduated cylindrical glass vessel, 40 mm in inner diameter, 300 mm in depth, 2 mL grading divisions from 0 to 250 mL)
7 air blow tube (air blow rate: 30 mL/min)
8 reference oil surface level

We claim:

1. A defoaming agent comprising:
    a polymer comprising a repeating unit represented by the following general formula (1):

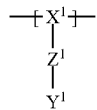

(1)

wherein in the general formula (1), $X^1$ is a repeating unit obtainable by polymerization of a first ethylenic unsaturated group; $Y^1$ is a side chain comprising a linear or branched polysiloxane structure, the polysiloxane structure comprising a repeating unit represented by the following general formula (2) and having a polymerization degree of 5 to 300; and $Z^1$ is a linking group linking the repeating unit $X^1$ and the side chain $Y^1$;

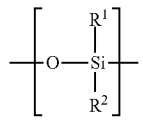

(2)

wherein in the general formula (2), $R^1$ and $R^2$ are each independently an organic group having a carbon number of 1 to 18;
the polymer further comprising a repeating unit represented by the following general formula (3):

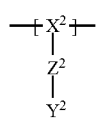

(3)

wherein in the general formula (3), $X^2$ is a repeating unit obtainable by polymerization of a second ethylenic unsaturated group; $Y^2$ is a side chain comprising no less than 3 fluorine atoms; and $Z^2$ is a linking group linking the repeating unit $X^2$ and the side chain $Y^2$.

2. The defoaming agent according to claim 1, wherein $X^2$ is a repeating unit obtainable by polymerization of a second (meth)acryloyl group.

3. The defoaming agent according to claim 1, wherein $X^1$ is a repeating unit obtainable by polymerization of a first (meth)acryloyl group.

4. The defoaming agent according to claim 1, wherein the polymer comprises the repeating unit represented by the general formula (1) in an amount of no less than 10 mass % on the basis of the total mass of all repeating units in the polymer.

5. The defoaming agent according to claim 1, wherein the polymer has a weight average molecular weight of 10,000 to 1,000,000.

6. A defoaming agent comprising:
    a polymer comprising a repeating unit represented by the following general formula (1):

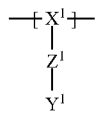

(1)

wherein in the general formula (1), $X^1$ is a repeating unit obtainable by polymerization of a first ethylenic unsaturated group; $Y^1$ is a side chain comprising a linear or branched polysiloxane structure, the polysiloxane structure comprising a repeating unit represented by the following general formula (2) and having a polymerization degree of 5 to 300; and $Z^1$ is a linking group linking the repeating unit $X^1$ and the side chain $Y^1$;

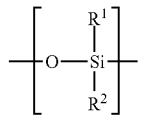

(2)

wherein in the general formula (2), $R^1$ and $R^2$ are each independently an organic group having a carbon number of 1 to 18;
wherein the polymer is a star-shaped polymer.

7. A lubricating oil composition comprising:
    (A) a lubricant base oil; and
    (B) the defoaming agent as in claim 1, in an amount of 1 to 100 mass ppm in terms of silicon on the basis of the total mass of the composition.

8. A method for lubricating an automobile engine, an automobile transmission, or an automobile transaxle unit, comprising
    supplying the lubricating oil composition according to claim 7 to an automobile engine, an automobile transmission, or an automobile transaxle unit.

9. The defoaming agent according to claim 6, wherein $X^1$ is a repeating unit obtainable by polymerization of a first (meth)acryloyl group.

10. The defoaming agent according to claim 6, wherein the polymer comprises the repeating unit represented by the general formula (1) in an amount of no less than 10 mass % on the basis of the total mass of all repeating units in the polymer.

11. The defoaming agent according to claim 6, wherein the polymer has a weight average molecular weight of 10,000 to 1,000,000.

12. A lubricating oil composition comprising:
(A) a lubricant base oil; and
(B) the defoaming agent as in claim 6, in an amount of 1 to 100 mass ppm in terms of silicon on the basis of the total mass of the composition.

13. A method for lubricating an automobile engine, an automobile transmission, or an automobile transaxle unit, comprising:
supplying the lubricating oil composition of claim 12 to an automobile engine, an automobile transmission, or an automobile transaxle unit.

14. A lubricating oil composition comprising:
(A) a lubricant base oil; and
(B) a defoaming agent in an amount of 1 to 100 mass ppm in terms of silicon on the basis of the total mass of the composition, the defoaming agent comprising a polymer, the polymer comprising a repeating unit represented by the following general formula (1):

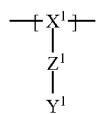
(1)

wherein in the general formula (1), $X^1$ is a repeating unit obtainable by polymerization of a first ethylenic unsaturated group; $Y^1$ is a side chain comprising a linear or branched polysiloxane structure, the polysiloxane structure comprising a repeating unit represented by the following general formula (2) and having a polymerization degree of 5 to 300; and $Z^1$ is a linking group linking the repeating unit $X^1$ and the side chain $Y^1$;

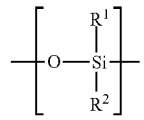
(2)

wherein in the general formula (2), $R^1$ and $R^2$ are each independently an organic group having a carbon number of 1 to 18,
wherein $X^1$ is a repeating unit obtainable by polymerization of a first (meth)acryloyl group.

15. The defoaming agent according to claim 14,
wherein the polymer comprises the repeating unit represented by the general formula (1) in an amount of no less than 10 mass % on the basis of the total mass of all repeating units in the polymer.

16. The defoaming agent according to claim 14,
wherein the polymer has a weight average molecular weight of 10,000 to 1,000,000.

17. A method for lubricating an automobile engine, an automobile transmission, or an automobile transaxle unit, the method comprising:
supplying the lubricating oil composition as in claim 14 to an automobile engine, an automobile transmission, or an automobile transaxle unit.

* * * * *